H. I. CHASE. P. F. CHASE & E. D. CHASE.

GRAIN-CONVEYER.

No. 6,856.

Reissued Jan. 11, 1876.

Witnesses:

A. P. Lacey

James Gummerson Jr.

Inventors:

Henry I. Chase, Philander F. Chase and Edwin D. Chase.

By G. B. Fowler, Attorney.

UNITED STATES PATENT OFFICE.

HENRY I. CHASE, PHILANDER F. CHASE, AND EDWIN D. CHASE, OF CHICAGO, ILLINOIS.

IMPROVEMENT IN GRAIN-CONVEYERS.

Specification forming part of Letters Patent No. 138,994, dated May 20, 1873; reissue No. 6,228, dated January 12, 1875; reissue No. 6,856, dated January 11, 1876; application filed December 31, 1875.

*To all whom it may concern:*

Be it known that we, HENRY I. CHASE, PHILANDER F. CHASE, and EDWIN D. CHASE, of Chicago, in the county of Cook and State of Illinois, have invented certain new and useful Improvements in Spiral Grain-Conveyer Flights; and we do hereby declare that the following is a full, clear, and exact description thereof, that will enable others skilled in the art to which it appertains to make and use the same, reference being had to the accompanying drawings and to the letters of reference marked thereon, which form a part of this specification.

Figure 2:
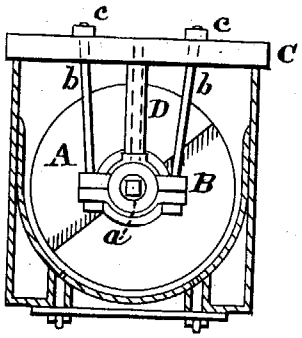
Figure 4:
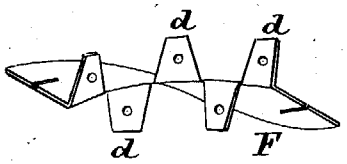
Figure 1:
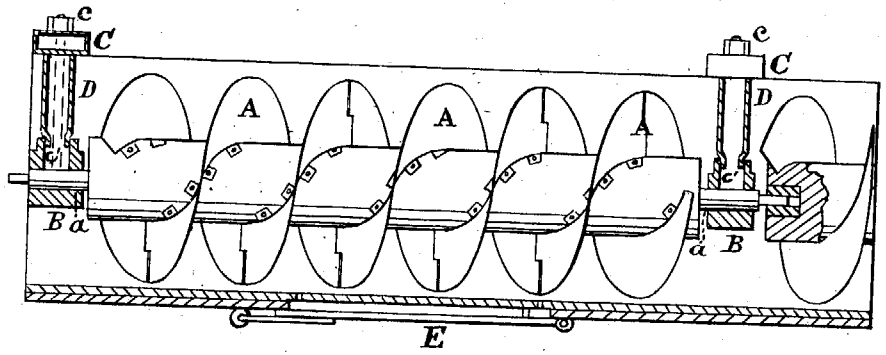
Figure 3:
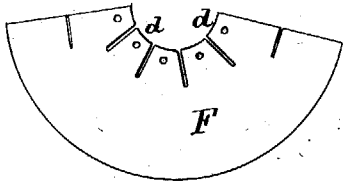

Figure 1 is a longitudinal sectional elevation of our improved grain-conveyer; Fig. 2, an end view; Fig. 3, a view showing a section of the conveyer-flight cut in the arc of a circle from sheet metal; and Fig. 4, a perspective view of the same section, showing its spiral form.

Like letters in all the figures of the drawings indicate like parts.

This invention consists of a continuous spiral grain-conveyer, having the journals of its shaft arranged in journal-boxes suspended from the upper part of a conveyer-trough or other place by means of adjustable brace-rods, so as to allow a free passage to the grain along the bottom of the trough, the said rods being arranged so that they can be adjusted to keep the conveyer centrally in the trough; also, in adjustable keys provided with oil-passages, in combination with cross-braces attached to the sides of the conveyer-trough and the journal-boxes, so as to keep the covers of the said journal-boxes down in place, and at the same time furnish convenient means for oiling the boxes; also, in providing the trough with a polished metallic lining, in combination with the conveyer, so as to facilitate the conveying of the grain through the trough, the bottom thereof being provided with a door, through which the grain is discharged; also, in the construction of the conveyer-flight in sections of sheet metal, each section being made to conform to a spiral shape, and attached so as to form one continuous flight when attached to the shaft, so that the said flight will bend or yield enough to allow an obstruction to pass that may be met with in the conveying of the grain through the trough, as will be hereinafter more fully explained.

A is the continuous spiral grain-conveyer, having the journals *a* at each end of its shaft arranged in the journal-boxes B, suspended from the cross-braces C by means of the rods or braces *b b*, having their lower ends attached to the ends of the journal-boxes, and their upper ends passed through the cross-braces, and provided with screw-threads to receive the screw-nuts *c c*. The said cross-braces are made to embrace the sides of the conveyer-trough firmly, so as to prevent the trough from spreading. D D are the keys, having an oil-passage through the center of each. The lower end of each key rests in a recess, *c'*, in the cover of each journal-box, the upper end passing through the cross-brace C, and secured firmly thereto. In case the cross-braces should be dispensed with, the keys will be screwed into the covers of the journal-boxes. The trough is lined with polished sheet metal, and provided with a door, E, through which the grain is discharged.

The conveyer-flight A is made in sections of sheet metal, each section F being cut in the arc of a circle (see Fig. 3) and provided with ears *d*, which are turned up alternately on opposite sides, having holes in them, by which they are fastened around the shaft with screws or nails. Each section, when thus cut out, with its ears duly cut and punched or drilled with screw or nail holes for attaching them to the shaft, is made to conform spirally to the shaft and stand out at right angles when attached thereto. (See Fig. 4.) The several sections are attached to the shaft, forming one continuous flight, which serves as a continuous band or ligature to stiffen and strengthen the shaft, and to prevent its splitting when heavily worked. The flights thus formed of sheet metal can be made cheaper than those of cast-iron, and are more durable, and when an obstruction gets into the conveyer-trough, such as a piece of iron or wood, they will not break off and endanger all the other flights on the shaft, and thereby cause an inconvenience in the handling of the grain, as is very often the case with cast-iron flights; but they will bend or yield sufficiently to allow the obstruction to pass, thus avoiding all stoppage or hinderance to the other parts of the conveyer, the bend being straightened out without taking the flight or flights off from the shaft.

The operation is as follows: With those conveyers supported by pillars set in the bottom of the trough the grain settles around the pillars, and will mix with other kinds of grain handled in the same conveyer, thus causing great inconvenience to the operator; but by suspending the conveyer from the top of the trough no impediment is offered to a free passage of the grain through the same. The adjustable braces can be raised or lowered on either side to keep the shaft of the conveyer rigidly in the center of the trough, so as to counteract any unequal pressure of the grain upon one side or the other of the conveyer-shaft, thus facilitating the passage of the grain through the conveyer. The keys furnish convenient means for oiling the journal-boxes, the oil-entrance being above the top of the trough and out of the way of the grain, and at the same time they hold the covers of the boxes in place, and also act as auxiliary stays or braces for supporting the journal-boxes.

Having thus fully described our invention, what we claim therein as new, and desire to secure by Letters Patent, is—

1. The continuous spiral grain-conveyer, having the journals of its shaft arranged in journal-boxes suspended from the top of a conveyer-trough by means of brace-rods, so as to allow a free passage of the grain along the bottom of the trough, substantially as set forth.

2. The combination of the adjustable keys D D, journal-boxes B B, and spiral grain-conveyer shaft, substantially as and for the purpose set forth.

3. The combination of the cross-braces C C, adjustable suspension-rods *b b*, journal-boxes B B, screw-nuts *c c*, adjustable keys D D, journals *a a* of conveyer-shaft, and conveyer-trough, substantially as set forth.

4. The conveyer-trough having a polished sheet-metal lining, and provided with the door E, in combination with the continuous spiral grain-conveyer A, substantially as set forth.

5. A grain-conveyer flight constructed in sections of sheet metal, each section being made to conform to a spiral shape, so attached as to form one continuous flight around the shaft, substantially as and for the purpose set forth.

6. The grain-conveyer flight constructed in sections of sheet metal, each section being cut in the arc of a circle having ears or lugs turned up alternately on opposite sides, and made to conform to a spiral shape, and attached around the shaft, substantially as set forth.

In testimony that we claim the foregoing we have hereunto set our hands this 1st day of December, 1875.

HENRY I. CHASE.
PHILANDER F. CHASE.
EDWIN D. CHASE.

Witnesses:
A. B. CAPRON,
HENRY G. CHASE.